United States Patent [19]

Ahlbrandt

[11] Patent Number: 4,556,544
[45] Date of Patent: Dec. 3, 1985

[54] RETRACT MECHANISM FOR CORONA TREATER STATION

[76] Inventor: Andreas Ahlbrandt, 17 Uhlandstrasse, Lauterbach, Fed. Rep. of Germany

[21] Appl. No.: 611,472

[22] Filed: May 17, 1984

[51] Int. Cl.⁴ .......................... B01J 19/08; C21D 1/09
[52] U.S. Cl. ................................ 422/186.04; 204/164; 422/186.05; 422/186.13; 422/186.26
[58] Field of Search ....................... 422/186.04, 186.05, 422/186.06, 186.11, 186.20, 186.22, 186.13, 186.23, 186.26, 186.08; 204/157.1 R, 157.1 H, 164, 176

[56] References Cited

U.S. PATENT DOCUMENTS

| | | | |
|---|---|---|---|
| 3,777,164 | 12/1973 | Osman | 422/186.05 |
| 3,973,132 | 8/1976 | Prinz et al. | 422/186.05 |
| 4,059,497 | 11/1977 | Kolbe et al. | 422/186.05 |
| 4,256,967 | 3/1981 | Treharne et al. | 422/186.26 |
| 4,273,635 | 6/1981 | Beraud et al. | 422/186.05 |
| 4,298,440 | 11/1981 | Hood | 422/186.05 |
| 4,446,110 | 5/1984 | Ahlbrandt | 422/186.05 |

Primary Examiner—Stephen J. Lechert, Jr.
Assistant Examiner—Howard J. Locker
Attorney, Agent, or Firm—Barry E. Sammons

[57] ABSTRACT

A corona treatment station includes a header which supports an active electrode along the surface of a metal roller electrode. The header is attached to the side assemblies by carriages which translate the header and attached active electrode away from the roller electrode when the header is rotated in either direction. This enables the active electrode to be swung clear of the roller electrode in either direction.

7 Claims, 9 Drawing Figures

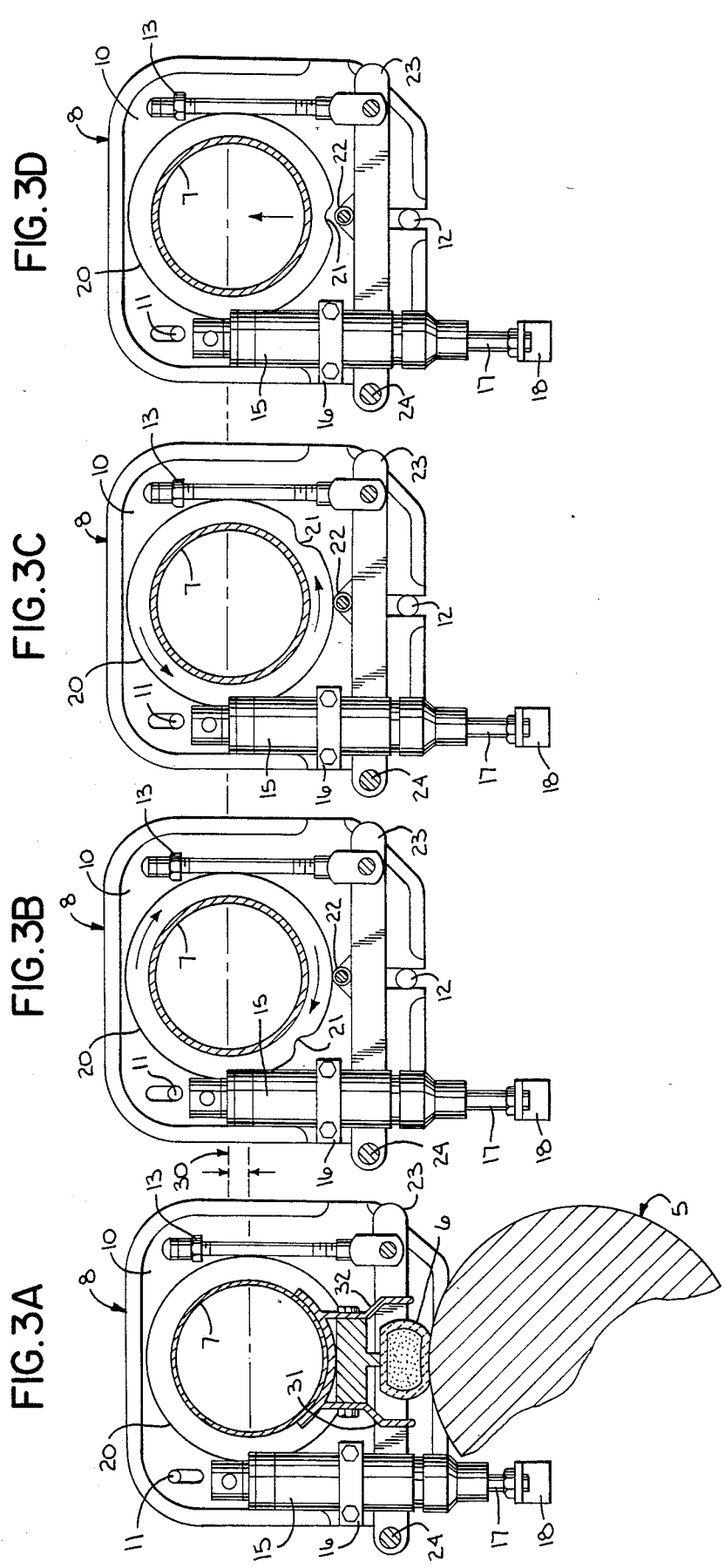

RETRACT MECHANISM FOR CORONA TREATER STATION

BACKGROUND OF THE INVENTION

The field of the invention is corona treater stations, and particularly, the construction of "open station" machines such as that disclosed in co-pending U.S. Pat. No. 4,446,110 issued on May 1,1984 and entitled "Treating the Surface of Articles by Electrical Brush Discharge."

Open station corona treaters include an active electrode which is supported along the surface of a roller electrode by a header which is attached at each of its ends to the side assemblies of the station. To facilitate threading of the station the header and attached electrode are mounted to swing clear of the roller electrode. The header is offset slightly to one side of the roller electrode to enable the active electrode and its protective skirt to swing clear of the roller without engaging its surface. This arrangement allows swinging motion in only one direction.

There are a number of situations where it is desirable to allow the active electrode to swing clear in either direction from the roller electrode. For example, as the web passes between the roller electrode and the active electrode, the active electrode must swing clear in the direction of the moving web when engaged by a thickened, or protruding, section of the web. The treater station is much more versatile if it can be positioned such that the web may move in either direction through the treatment zone, and this requires a structure which enables the active electrode to swing clear of the roller electrode in both directions.

SUMMARY OF THE INVENTION

The present invention relates to a corona treater station in which the header and the active electrode which it supports may be swung in either direction from their treatment position over a roller electrode. More specifically, the invention includes a pair of spaced carriages which are slidably mounted to the station's side assemblies and which are rotatably fastened to the respective ends of the header. A cam surface is formed at each end of the header and an associated cam follower is mounted to each side assembly. The cam surface is contoured to translate the rotational motion of the header in either direction into a sliding motion which moves the header and attached carriages away from the roller electrode.

A general object of the invention is to enable the active electrode to swing clear of the roller electrode in either direction. By mounting the ends of the header to the slidable carriages, the header may be lifted away from the roller electrode to provide ample clearance between the roller and the active electrode. This clearance enables the active electrode to be swung freely in either direction without engaging the roller electrode.

Another object of the invention is to provide a rugged and economical construction. The lifting force which translates the carriages and attached header away from the roller electrode is provided by the cam surfaces and associated cam followers. These "passive" elements translate the force which is rotating the header into the lifting force.

Yet another object of the invention is to provide a threading position which does not require rotation of the header and attached active electrode. This is accomplished by a pair of air cylinders which connect between the side assemblies and their corresponding carriages. Operation of the air cylinders translates the carriages away from the roller electrode, thus providing ample space beneath the active electrode through which the web may be threaded.

These and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 3A is a partial cross sectional view taken along the plane 3A—3A indicated in FIG. 1;

FIGS. 3B—3D are partial cross sectional views taken along the plane 3B—3B indicated in FIG. 1;

DESCRIPTION OF THE PREFERRED EMBODIMENT

Figure 1:
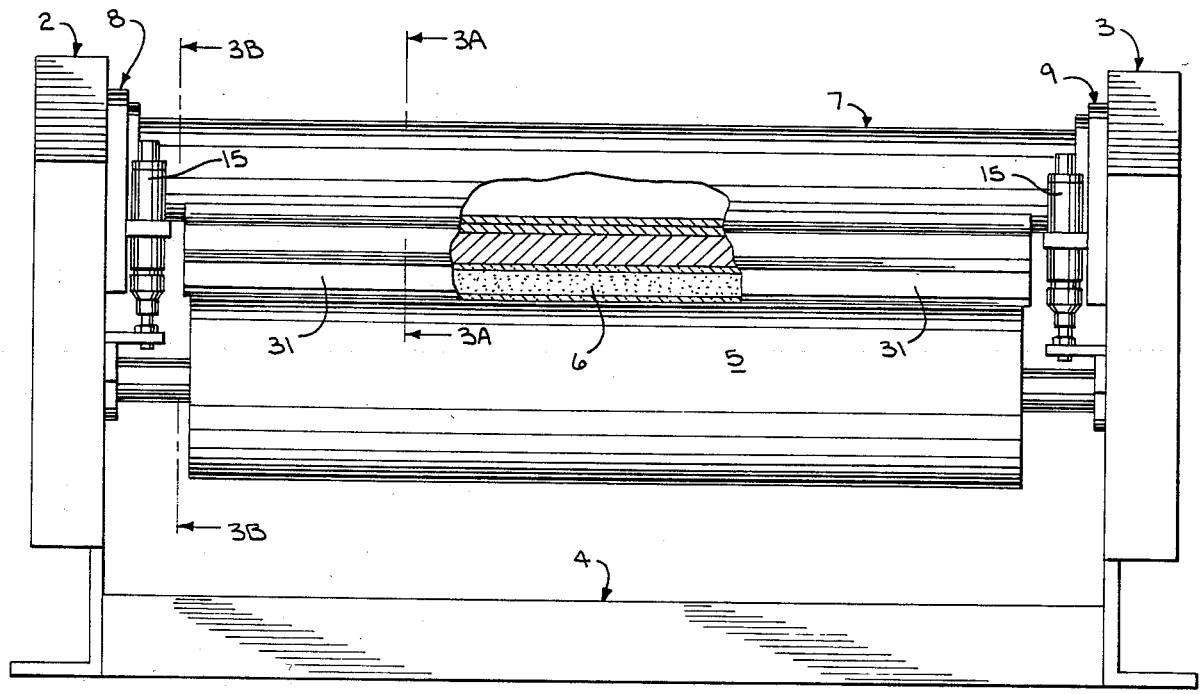
FIG. 1 is an elevation view of the corona treater station which employs the present invention.

Referring particularly to FIG. 1, the treater station includes a pair of upright side assemblies 2 and 3 which are supported by a frame 4. A metal roller electrode 5 is supported horizontally between the side assemblies 2 and 3 for rotation in either direction. An active electrode 6 is supported above the roller electrode 5 by a circular, cylindrical header 7 which extends horizontally between the side assemblies 2 and 3. As will be explained in more detail below, the header 7 is attached to the side assemblies 2 and 3 by respective carriages 8 and 9, which not only allow the header 7 to rotate in either direction, but enable it to translate upward, or radially outward, from the roller electrode 5.

As is well known in the art, a web of material to be treated is threaded by inserting it between the roller electrode 5 and active electrode 6. A corona producing a.c. voltage is applied across the electrodes 5 and 6 and the web is pulled through the treater station to bombard its surface with ions produced in the corona. It is an advantage of the present invention that the web may travel in either direction through the corona treatment zone.

The bidirectional ability of the treater station results from the unique attachment of the header 7 to the side assemblies 2 and 3. As shown best in FIGS. 2 and 3, each carriage 8 and 9 is comprised of a rectangular plate 10 which is retained to the side assembly 2 or 3 by a set of three guide pins 11, 12 and 13. The guide pins 11–13 are located in vertical slots formed in the plate 10 and they allow the carriage to slide between a lower, treatment, position and an upward, threading, position.

The rectangular plate 10 may be translated between its treatment position and its threading position by an air cylinder 15. The body of the air cylinder 15 is fastened to the plate 10 by a clamp 16 and its rod 17 is fastened to the side assembly by a bracket 18. In its unactuated state the cylinder 15 and attached plate 10 are pulled downward by gravity to the position shown in FIG. 3A. When air is applied to actuate the cylinder 15, however, the rod 17 extends and the cylinder 15 with attached plate 10 is translated upward to the position shown in FIG. 3D. As will now be explained in more detail, this translational motion also lifts the header 7 and attached active electrode 6 away from the roller electrode 5 to enable the treater station to be threaded.

It can be appreciated that the header 7 and attached active electrode 6 need not be directly above the roller electrode 5 as is shown in the drawings. Indeed, additional headers and associated active electrodes may be positioned around the roller electrode 5 to either side of that shown. In such case, their carriages will slide in a non-vertical, radial direction with respect to the axis of the roller electrode 5.

Figure 2:
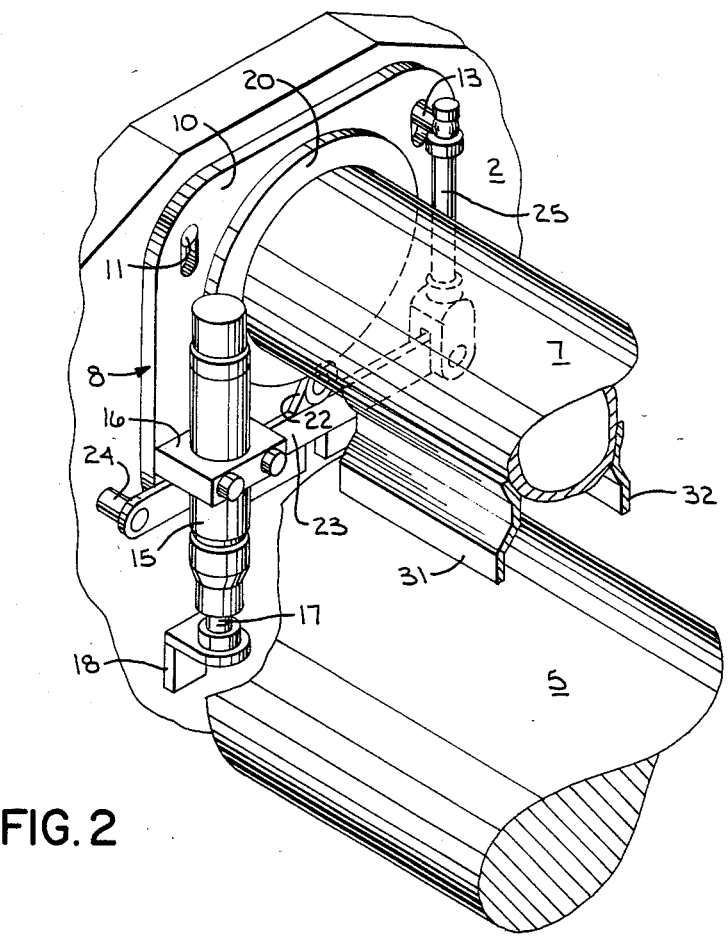
FIG. 2 is a partial perspective view of the station of FIG. 1.

Referring still to FIGS. 2 and 3, the end of the header 7 is rotatably received in an opening formed in the carriage plate 10. A bushing (not shown) provides a suitable bearing surface which enables the header 7 to rotate within this opening with minimal frictional resistance. A collar 20 is fastened around each end of the header 7 and is disposed immediately in front of the plate 10. An indentation on the collar 20 forms a cam surface 21 which is precisely aligned with the active electrode 6 when the active electrode is in the treatment position.

A cam follower 22 is supported by an arm 23 to engage the cam surface 21 when the header 7 and attached active electrode 6 are in their treatment position. The support arm 23 is attached to the side assembly at one of its ends by a pivot pin 24, and its free end connects to an adjustment arm 25. The adjustment arm 25 extends upward and fastens to the side assembly through the guide pin 13. By altering the length of the adjustment arm 25, the position of the cam follower 22 may be precisely determined and the spacing of the header 7 and active electrode 6 can thus be precisely controlled. Such an adjustment may be necessary, for example, when a web of a different thickness is to be treated.

As illustrated in FIGS. 3B and 3C, when the header 7 is rotated in either direction from the treatment position, the cam follower 22 rides out of the notch-like cam surface 21 and onto the periphery of the collar 20. As shown by the arrows 30, the header 7, the attached electrode 6 and the carriages 8 and 9 are all translated upward and away from the roller electrode 5 when this rotation in either direction occurs. This upward motion is produced by the stationary cam followers 22 which translate the rotational motion of the header 7 into a linear motion that moves the active electrode 6 away from the treatment position of FIG. 3A. The clearance thus produced enables the electrode 6 and the surrounding skirts 31 and 32 to swing clear of the roller electrode 5 in either direction.

Figure 4C:
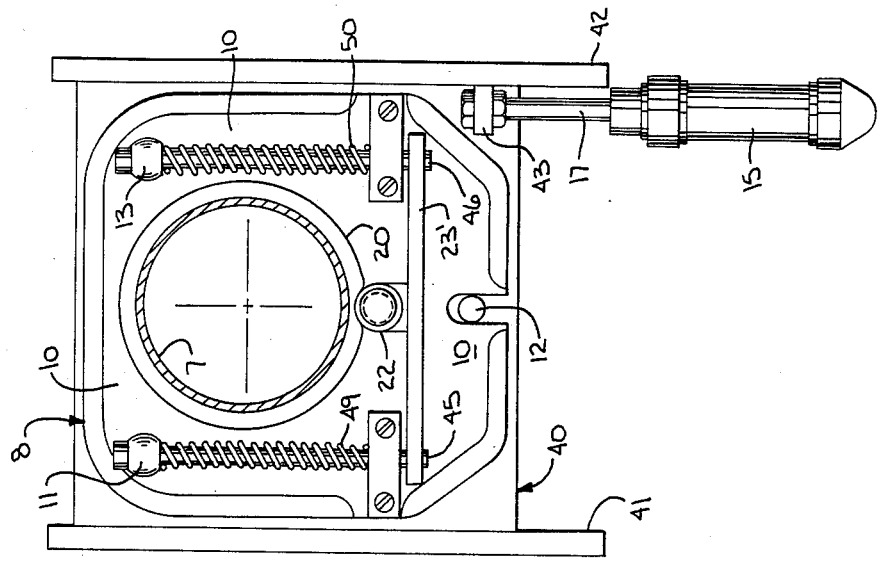
FIGS. 4B and 4C are partial cross sectional views of the alternative embodiment of the invention taken along the plane 3B—3B indicated in FIG. 1.
Figure 4B:
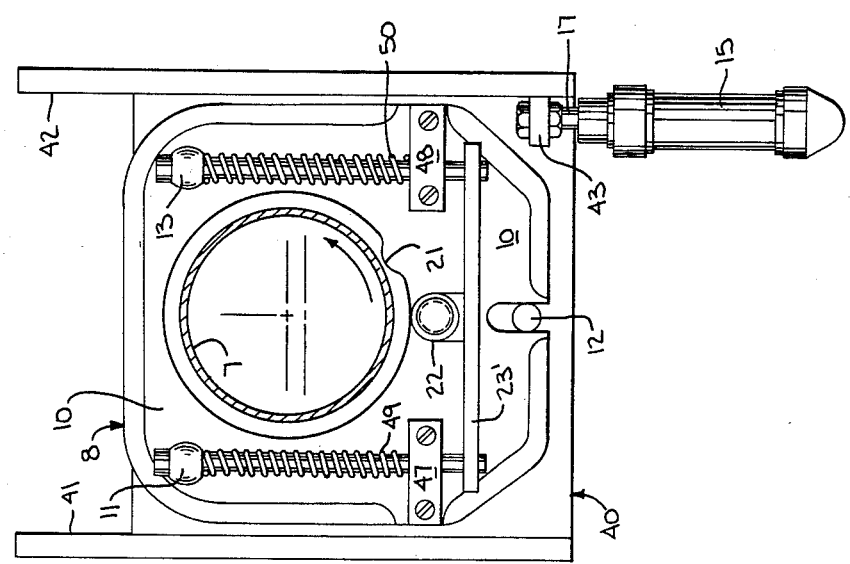
Figure 4A:
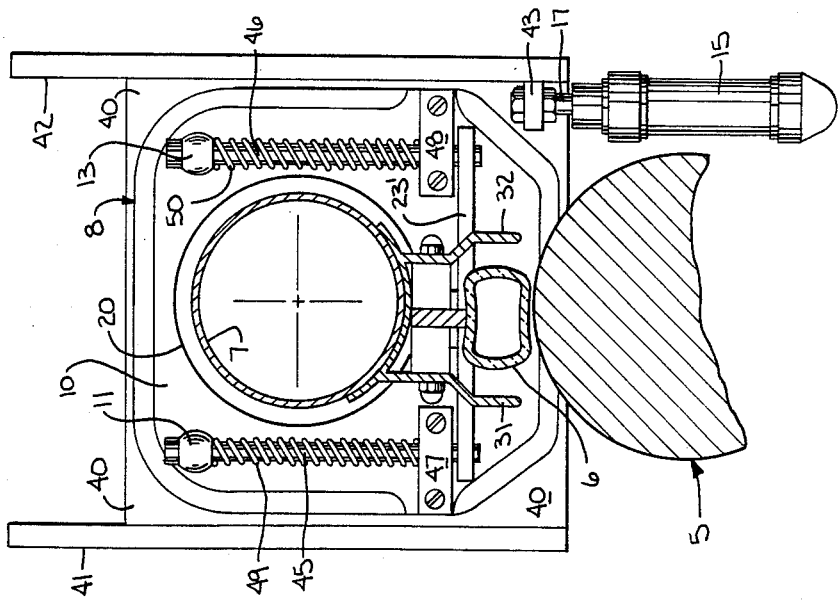
FIG. 4A is a partial cross sectional view of an alternative embodiment of the invention taken along the plane 3A—3A indicated in FIG. 1.

Referring particularly to FIGS. 4A-4C, an alternative embodiment of the invention is shown in which the carriage 8 is slidably mounted to a platform 40 which is in turn slidably mounted to one of the side assemblies 2 or 3 by a pair of guideways 41 and 42. The air cylinder 15 in this embodiment is fastened to the side assembly 2 or 3 and the end of its rod 17 is fastened to the platform 40 by a bracket 43. As shown in FIG. 4C, when the air cylinder 15 is energized, the entire structure mounted to the platform 40 is shifted upward along the guideways 41 and 42 to its "threading" position. While this alternative embodiment is more complex, it should be apparent that the header 7 and attached active electrode 6 can be moved a substantially greater distance away from the roller electrode 5 with this arrangement. This facilitates threading of the treater and maintenance of the active electrode 6.

Another significant difference in the alternative embodiment of the invention is the manner in which the cam follower 22 is supported and adjusted. The cam follower 22 is attached to an arm 23' which is supported at each of its ends by adjustment rods 45 and 46. The top end of each adjustment rod 45 and 46 is rotatably fastened to respective guide pins 11 and 13, and their lower ends extend through openings in respective guide blocks 47 and 48 which are firmly attached to the carriage 8. The lower end of each adjustment rod 45 and 46 is threaded and is received in a threaded opening in the arm 23'. By rotating the adjustment rods 45 and 46, therefore, the separation of the arm 23' from the guide pins 11 and 13 can be precisely adjusted. Springs 49 and 50 encircle the respective adjustment rods 45 and 46, and they provide a bias force which urges the guide blocks 47 and 48, and the attached carriage 8 downward.

The guide pins 11 and 13 are fastened to the platform 40 and when the header 7 rotates, as shown in FIG. 4B, the carriage 8 is lifted upward by the action of the cam surface 21 and the cam follower 22. The guide blocks 47 and 48 are thus lifted against the bias force produced by the springs 49 and 50. This bias force urges the carriage 8 downward and maintains the active electrode 6 firmly in place when the header 7 is rotated back to its operating position shown in FIG. 4A. The precise spacing of the active electrode 6 from the roller electrode 5 may be adjusted by rotating the adjustment rods 45 and 46 to alter their effective length.

It should be apparent that a number of variations are possible from the construction shown in the drawings. For example, the cam surfaces 21 can be contoured such that the header 7 is urged back to its treatment position when the force swinging it away from the roller electrode 5 is removed. Thus, when a thickened portion of the web engages the active electrode 6 or one of the surrounding skirts to swing the assembly in the direction of web motion, the assembly will return to the treatment position after the thickened portion clears the treatment zone.

I claim:

1. In a treater station which includes a roller electrode supported between a pair of spaced side assemblies and an active electrode supported adjacent the roller electrode by a header which extends between the pair of spaced side assemblies, the improvement therein which comprises:

a pair of carriages connected to respective ends of the header and slidably connected to the respective side assemblies, the carriages being slidable between a treatment position in which the active electrode supported by the header is positioned close to the roller electrode and a threading position in which the active electrode is spaced radially outward from its treatment position; and cam means connected to respective side assemblies and being operable to translate rotational motion of the header into a sliding motion which moves the carriages between their treatment and threading positions; and whereby the active electrode is withdrawn from its treatment position to its threading position when the header is rotated in either direction to thereby enable the active electrode to be swung clear of the roller electrode.

2. The improvement as recited in claim 1 in which power cylinders connect between each carriage and its associated side assembly, and the power cylinders may be operated to translate the carriages between their treatment position and their threading position.

3. The improvement as recited in claim 1 in which each cam means includes a collar disposed around the header to provide a cam surface, and a cam follower is mounted to the side assembly and positioned to engage the cam surface on the collar.

4. The improvement as recited in claim 3 in which the position of the cam follower may be adjusted to alter the position of the active electrode with respect to the roller electrode.

5. The improvement as recited in claim 1 in which the slidable connection between each carriage and its respective side assembly includes a platform which is slidably mounted to the side assembly, and in which the carriage is slidably mounted to its associated platform.

6. The improvement as recited in claim 5 in which each platform is connected to a power cylinder which translates the platform and attached carriage between their treatment position and their threading position.

7. The improvement as recited in claim 6 in which bias means connect between each carriage and its associated platform, and the bias means urges the carriages into their treatment position.

* * * * *